Patented Jan. 19, 1932

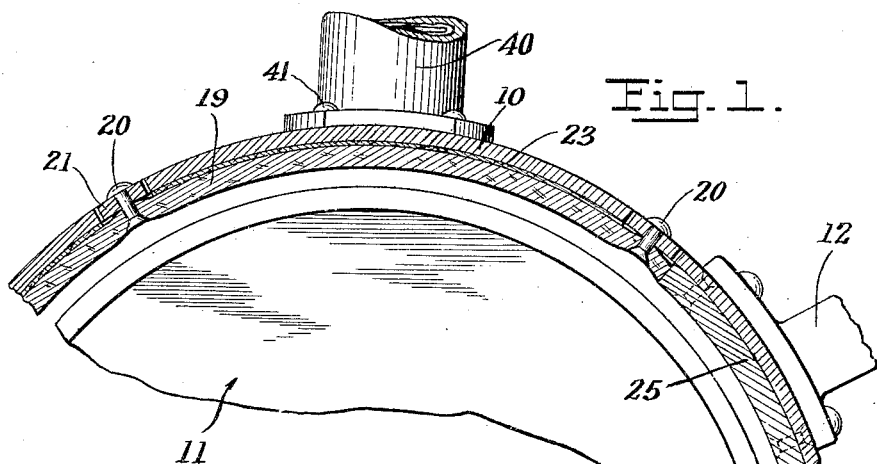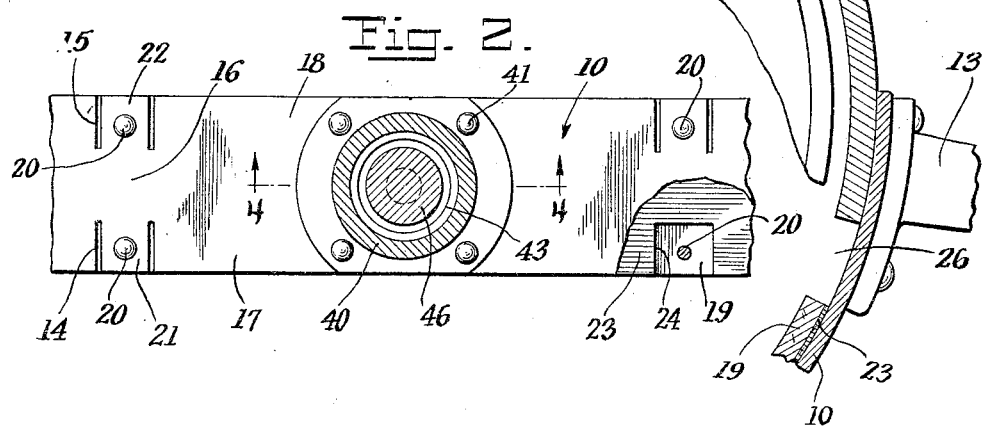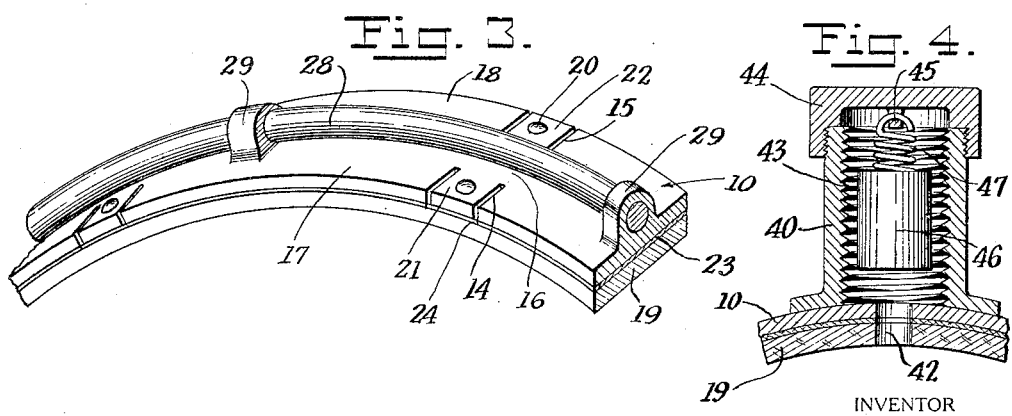

1,842,102

UNITED STATES PATENT OFFICE

CHARLES Y. KNIGHT, OF PASADENA, CALIFORNIA, ASSIGNOR, BY MESNE ASSIGNMENTS, TO CHESTER H. BRASELTON CORPORATION, OF JERSEY CITY, NEW JERSEY, A CORPORATION OF DELAWARE

BRAKE BAND CONSTRUCTION

Application filed December 10, 1924. Serial No. 754,936.

This invention relates to a brake band of the type used for gripping a brake drum on motor vehicles and similar apparatus.

An object of the invention is to provide a brake band and lining structure which will prevent the squeaking produced under severe operating conditions in the usual type of brakes heretofore used, and also to provide a brake band and lining which will set and cling uniformly on the brake drum under gentle pressure without severe seizing and resultant shock.

Investigation has apparently indicated that squeaks are caused by hard spots or uneven surfaces in contact with the moving surface of the drum, such, for example, as are caused by the structure of the brake fabric or by the lining securing rivets which either come directly into contact with the surface of the drum or press the immediately surrounding portions of the lining fabric against the drum surface. Unevenness is also caused by a tendency of the brake drum to warp to a bell shape at its edges as it becomes hot or to wear hollow or unevenly at the center and thus contact unevenly with the usual flat stiff surface of the brake band lining.

Accordingly, further objects of the invention are to provide means of supporting and securing the lining on the brake band which will prevent contact of the rivets or the immediately surrounding lining, with the brake drum of higher pressure than at other points of the lining; to provide means which will provide a uniform, resilient pressure of the lining on the drum; to provide means which will permit the brake band to conform to the surface of the drum; to provide means which will distribute a powdered or other dry lubricating medium about the lining surface and the drum surface; to provide means which will prevent local high or hard spots, and present smooth, uniform contact surfaces between the drum and the lining; to provide an effective means for supplying a soft, metallic or similar lubricating and filling composition to the lining surface; and to provide a structure that will enable the brakes to be applied so as to easily and readily set with a minimum of actuating force.

With these and other objects in view, which may be more readily and fully perceived from the following description, the invention comprises an apparatus described and set forth in the following specification and claims.

The various features of the invention are illustrated in the accompanying drawings, in which:

Figure 1 is a side view, partly in section of a portion of a brake drum and a brake band embodying a preferred form of my invention;

Figure 2 is a plan view of a development of a portion of the brake band, portions being broken away to indicate the interior structure of the band and lining;

Figure 3 is a perspective view of a slightly modified form of the band, showing a reinforcing means for the central portion of the band; and Fig. 4 is a sectional elevation of a lubrication container for the band.

In my present invention, the brake band is formed or provided with a central portion in which the gripping pressures are transmitted linearly and with a number of transverse or lateral shoulders or wings through which these pressures are distributed laterally. This structure may and preferably is obtained by forming kerfs or cuts extending inwardly from the side edges to the central portion, leaving shoulders or tongues having sufficient stiffness to transmit the pressures but capable of yielding sufficiently to fit any unevenness of the drum. A brake lining is mounted on the band and a resilient cushion, of cork or equivalent material, is inserted between the band and the lining, in which any unevenness is taken up and the lining permitted to accommodate itself to irregularities in the drum surface.

The lining is secured to the brake band by rivets and the support for the lining is countersunk about the rivets, preferably by cutting away the cork cushion at these places, so that the end of the rivet cannot come into contact with the drum surface. To insure a smooth, uniform surface for the brake lining, a body of a solid or metallic lubricating and filling medium is mounted in a portion of the brake band in position to contact with the surface of the drum so that it is spread and distributed over the surfaces of the brake lining and drum by the relative movement of these surfaces, filling the interstices of the lining fabric and coating the surface of the drum with the soft material which thus provides surfaces free of local hard spots.

Referring more particularly to the accompanying drawings, the brake band is formed of a strip of metal 10, extending around a brake drum 11 from an upper toggle attachment member 12 to a lower attachment member 13, and having pairs of transverse kerfs or cuts 14 and 15 at spaced intervals extending inwardly from the opposite side edges of the strip for short distances to a central longitudinal neck portion 16. The gripping force received from the toggle members is transmitted linearly about the drum through the neck portion 16 and is distributed laterally to shoulder portions 17 and 18 formed between the cuts 14 and 15 of adjacent pairs of cuts, the metal of the shoulders being of sufficient stiffness and rigidity to press against the brake drum while the cuts permit them to give sufficiently to avoid local spots of extreme pressure.

A brake band lining 19 of suitable asbestos fabric construction and of substantially the same width as the brake band is mounted on the underside of the band 10, extending throughout the entire surface of the band and pressed against the surface of the brake drum by a central neck portion of the band and by the shoulder portions 17 and 18. The brake lining 19 is attached to the band 10 by means of rivets 20 which are secured in the lining fabric and also in tongues 21 and 22 formed integral with the metal of the band 10 between cuts 14 and 15 of a pair of cuts, the tongues 21 and 22 accordingly lying between pairs of adjacent shoulder portions 17 and 18, respectively.

A layer of cork 23 of substantially the same width as the brake lining is placed between the lining and the metal band to provide a resilient cushion which will permit the lining to yield slightly against the pressure of the brake band. Notches 24 are cut from the cork layer immediately beneath each of the tongues 21 and 22 to provide countersunk surfaces immediately around the rivets 20 and permit the fabric of the lining and the outer surfaces of the rivets to be drawn inwardly from contact with the surface of the brake drum and thus avoid the formation of any hard spots about the rivets. This construction insures the equal distribution of the pressure exerted by the toggle members 12 and 13 throughout the entire surface of the brake band regardless of any unevenness in the brake drum, and with a resilient cushion pressure that prevents a too severe gripping or seizing of the brake.

Additional means are provided also for improving the gripping action of the brake and preventing the undesirable squeak ordinarily attending the action of braking surfaces, particularly in connection with automobile uses. The means provided for this accomplishment consists in the employment of such soft alloys, metals or other solids as have a lubricating action when placed between braking surfaces, examples of these materials being soft lead and graphite, or suitable alloys or mixtures of metals and graphite.

As effective means of supplying the lead to the area intermediate the friction surfaces of the brake, I utilize a cylindrical block 40 applied preferably to the top of the brake band 10 as by rivets 41. The block or tube resting directly above an aperture 42 formed in the band 10, cork lining 23 and friction lining 19, the aperture terminating adjacent the brake drum 11; and the interior of the tube 40, is roughened as, for example, by a coarse thread 43 to act as a grater upon the lead, as will be hereinafter described. A cap 44 is secured in any suitable manner to the top of the tube 40 and carries an eye 45 on its lower surface within the tube to which the lead block 46 is resiliently attached by means of a coil spring 47, the end of the spring hooking into the eye 45. It is evident that when the vibration is imparted to the tube, the lead block will oscillate on its support and contact against tht roughened interior of the tube, and in this manner small particles of lead are removed from the block and deposited through the aperture 42 upon the surface of the brake drum 11. This lubricant is applied continuously while the support is in vibration, or in other words, while the vehicle is in motion and this lubricant effectively spreads over the friction surfaces and prevents squeaking, and greatly improves in general, the gripping action of the mechanism.

An advantageous element of the mechanism also resides in the employment of a bronze block 25 fastened in place of the friction lining 19 adjacent the end of the band 10 beneath the toggle element 12. The bronze plate is extended beyond the end plate 10 bridging the gap intermediate the open ends of the bands 10 and terminating underneath the second toggle member 13, there being an open area as 26 at the end of the bronze plate permitting longitudinal movement thereof without interference with the lining members 19 and 23. The end of the bronze segments adjacent the open space 26 is, of course free. The bronze plate 25, as operated by the pressure of the toggles, tends to pull the brake on properly and thus improve the braking action of the brake mechanism as the whole. The placement of the bronze plate 25 so as to operate directly beneath the toggle members 12 and 13, is advantageous as the ordinary friction material tends to harden from the local high pressure, thus causing noise.

To reinforce and strengthen the central neck portion 16 of the brake band, a reinforcing ring 28 may be mounted and secured on the outer surface of the band by means of lugs or ears 29 through which the ring passes. This reinforcement is, however, not generally necessary and may be accomplished in any other suitable manner.

The various advantageous features of the invention above described combine to give maximum efficiency to the mechanism as a whole. The utilization of a pliable lining and flexible band provides a soft and full contact with the brake drum, and consequently a maximum gripping surface intermediate the brake drum and the linings. This is one of the most necessary requirements of an effective brake.

In addition, the utilization of the bronze block provides improved means for pulling the brake into frictional contact by pressure as applied in the usual manner through the toggles from the driver's seat, the bronze preventing such hardening as would occur in fabrics causing squeak and at the same time cooperating efficiently with the remainder of the brake mechanism to transmit an effective gripping action. Moreover, the utilization of lubricant, such as lead, supplied in the novel means described, combines with the other elements of the invention to bring about a highly efficient gripping surface, and to prevent squeak between the surfaces, this action being accomplished without any danger of melting of the original supply of lead or analogous lubricant, such as would ordinarily result if the lead were applied as a bearing directly on the brake band.

With the above brake construction, when the brake is applied, the vehicle or other driven mechanism comes to a gradual stop without noise and without the series of rapid gripping and release actions frequently occurring with the usual type of brake under severe strains. The construction of the brake band and lining also insures the highest efficiency in the braking effect and enables the brake to be effectively operated with a minimum of effort.

As changes of construction could be made within the scope of my invention, it is desired that all matter contained in the above description or shown in the accompanying drawings shall be interpreted as illustrative and not in a limiting sense.

Having described my invention, what I desire to secure by Letters Patent and claim is:

1. A brake band having a series of saw cuts extending inwardly from the side edges thereof at spaced intervals, a brake lining and a plurality of means to attach said lining to said band, each of said means being adjacent one of said saw cuts.

2. A brake band having a series of saw cuts extending inwardly from the side edges thereof at spaced intervals, said cuts being arranged in spaced pairs forming tongues between the cuts of each pair and shoulders between said pairs, a brake lining and a plurality of means to attach said lining to said band, each of said means being positioned on one of said tongues.

3. A brake band having a series of saw cuts extending inwardly from the side edges thereof at spaced intervals, said cuts being arranged in spaced pairs forming tongues between the cuts of each pair and shoulders between said pairs, said pairs being arranged on opposite sides of a central continuous strip lengthwise of the band, a brake lining and a plurality of means to attach said lining to said band, each of said means being positioned on one of said tongues.

4. A brake band having a series of cuts extending inwardly from the side edges thereof at spaced intervals, and a reinforcement extending lengthwise and centrally of said band.

5. A brake band having a series of cuts extending inwardly from the side edges thereof at spaced intervals, said cuts being arranged in spaced pairs forming tongues between the cuts of each pair and shoulders between said pairs and a brake lining secured to said tongues, said tongues forming the only points of attachment between said band and lining.

6. A brake band having a series of cuts extending inwardly from the sides thereof at spaced intervals, said cuts being arranged in spaced pairs forming tongues between the cuts of each pair and shoulders between said pairs, a brake lining, and rivets securing said lining to said tongues, said tongues forming the only points of attachment between said band and lining.

7. A brake band having a series of cuts extending inwardly from the sides thereof at spaced intervals, said cuts being arranged in spaced pairs forming tongues between the cuts of each pair and shoulders between said pairs, a brake lining, means for providing a supporting surface for said lining countersunk at said tongues, and rivets securing and drawing said lining to said tongues.

8. A brake band having a series of cuts extending inwardly from the sides thereof at spaced intervals, said cuts being arranged in spaced pairs forming tongues between the cuts of each pair and shoulders between said pairs, a brake lining, a resilient cushion between said lining and said brake band having cut-away portions beneath said tongues, and rivets securing said brake lining to said tongues.

9. A brake band having a series of cuts extending inwardly from the sides thereof at spaced intervals, said cuts being arranged in spaced pairs forming tongues between the cuts of each pair and shoulders between said pairs, a brake lining, a resilient cushion between said lining and said brake band having cut-away portions beneath said tongue, and means for securing said lining to said tongues and drawing the surface of said lining towards said tongues.

10. A brake band, a lining for said band, a layer of resilient cushion material between said band and said lining, and rivets securing said lining to said band, said layer being cut away around said rivets.

11. A brake band, a lining for said band, a layer of cork between said band and said lining, and rivets securing said lining to said band, said layer being cut away about said rivets.

12. A brake band, a lining for said band, a layer of cork between said band and said lining, said layer having cut-away portions spaced along its outer edges, and means for securing said lining to said band at said cut-away portions.

13. In brake mechanism the combination of a drum; a split band surrounding and adapted to engage said drum; a guide member fastened to one end of said band and adapted to engage said drum and to slidably engage and overlap the other end of said band; and power transmitting elements attached to the end of said band adapted to transmit force to the drum through the guide member.

14. The combination of a brake drum; a brake band operatively disposed therewith; a friction lining interposed between the drum and the band; and an auxiliary metallic friction member adjacent one end of the lining; said metallic friction member being relatively slidable with respect to one end of the band and functioning to distribute forces applied thereto.

15. The combination of a brake drum; a brake band operatively disposed therewith; a friction lining interposed between the drum and the band; and an auxiliary metallic friction member formed unitarily with one end of the band, said auxiliary member being slidably disposed with respect to the other end of the band and adapted to undergo compressive braking action.

16. The combination of a brake drum; a brake band operatively disposed therewith; a friction lining interposed between the drum and the band; and an auxiliary metallic friction member continuous with one end of the lining and adapted to engage the surface of the drum, said auxiliary member being arranged to sustain compressive braking action and distribute evenly to the adjoining drum surface the forces so imparted.

17. The combination of a brake drum; a brake band operatively disposed therewith; a friction lining secured to the band; and an auxiliary metallic friction member secured to one end of the band and slidably disposed with respect to the other, said lining and auxiliary member being interposed between the drum and band and adapted to wrap completely about the drum, thereby imparting braking action to the entire periphery of the drum.

18. The combination of a brake drum; a friction lining partially surrounding the periphery of the drum; a brake band united with the lining and engageable with a portion of the drum; and an auxiliary metallic friction member secured to one end of the band and adapted to engage a portion of the drum left exposed by the lining, said auxiliary friction member being adapted to undergo compressive frictional engagement with said drum.

19. The combination of a brake drum; a friction lining partially surrounding the periphery of the drum; an auxiliary metallic friction member; and a brake band securely united with the lining and with one end of the auxiliary member the other end thereof being slidably disposed with respect to the band and adapted to be compressed into engagement with the drum.

In testimony whereof, I affix my signature.

CHARLES Y. KNIGHT.